Feb. 12, 1929.
H. R. BEAVER
AUTOMOBILE BUMPER
Filed Oct. 18, 1927
1,702,027
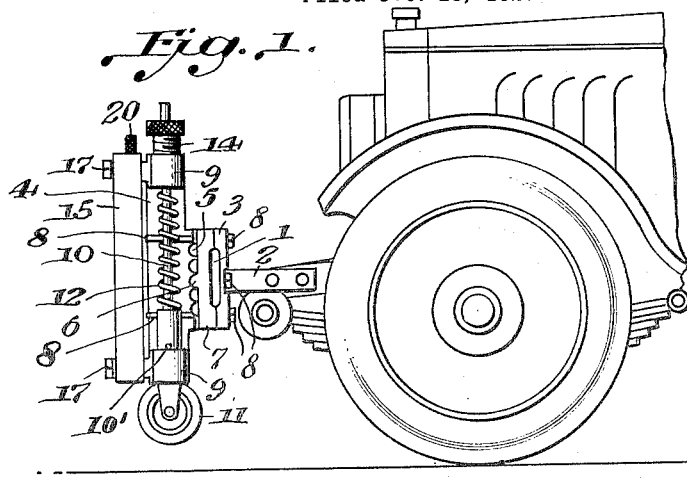
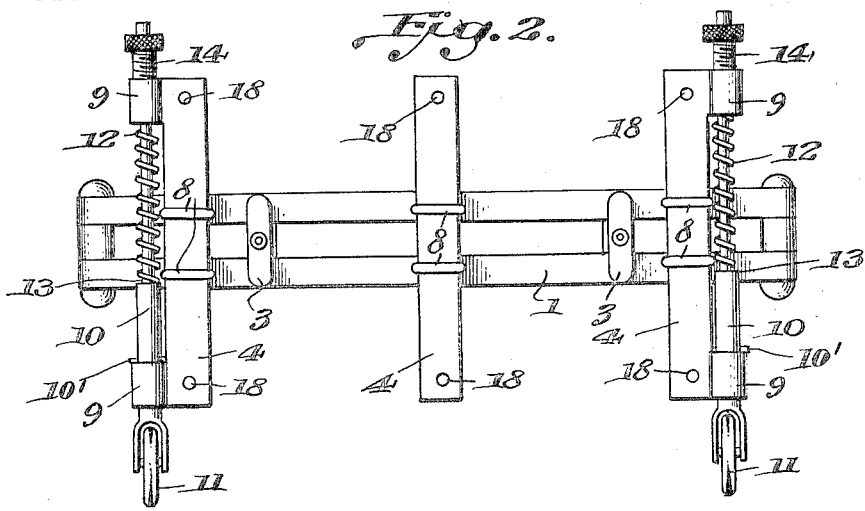
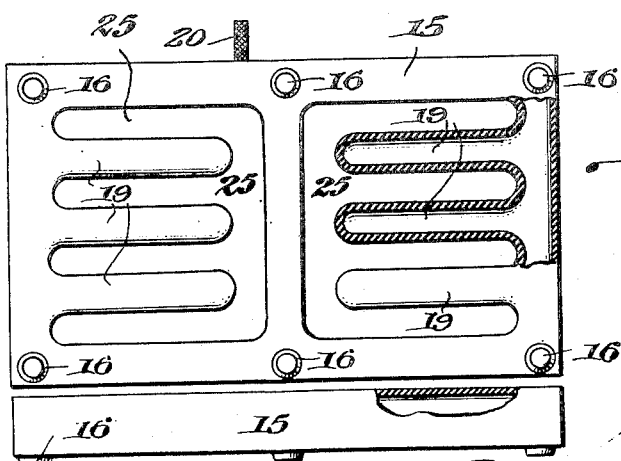
Inventor;
Harry Richard Beaver
By Patented Feb. 12, 1929.

1,702,027

UNITED STATES PATENT OFFICE.

HARRY RICHARD BEAVER, OF EVANSVILLE, INDIANA, ASSIGNOR OF ONE-HALF TO AUGUST KLUSMEIER, OF EVANSVILLE, INDIANA.

AUTOMOBILE BUMPER.

Application filed October 18, 1927. Serial No. 226,901.

The present invention relates to an improved automobile bumper adapted to serve as a supplemental or substitute wheel, in addition to its usual purpose, should a front wheel of the automobile be knocked off or so badly damaged that it cannot be used, whereby the car will be prevented from dropping in that event.

With that end in view, my improved bumper is provided with spring-cushioned supplemental wheels which normally are disposed above the road or highway when the bumper is on the car but which support the car if a front wheel is broken or taken off from an accidental cause, thereby minimizing the danger of the car turning over and also enabling it to be propelled to some suitable place where it may be repaired. Two of the supplemental wheels are used so that either or both of them may be availed of.

Another object of the invention is to provide an improved elastic cushion which will minimize danger of injury to the person struck by the bumper.

This object is accomplished by providing an inflatable rubber pad having independent, inflatable, fingers which softly cushion the effect of the impact on the person struck.

A still further object is to provide improved means for clamping the bumper to the ordinary bar-bumper usually carried by automobiles, whereby my bumper may be quickly and easily mounted and readily adjusted.

In the accompanying drawings:

Figure 1, is a side elevation showing the bumper attached to the front of an automobile, the latter being broken away;

Fig. 2, is a front elevation of the bumper, shown applied to an ordinary bumper, the pneumatic cushion being omitted to better disclose the remaining part of the bumper;

Fig. 3, is a front elevation of the pneumatic cushion by itself, partly broken away;

Fig. 4, is a plan view thereof.

The ordinary bumper of a type commonly used on automobiles, is shown at 1 and is carried by brackets 2 and clamps 3. My bumper is attached to the ordinary bumper which adapts the device for use on an automobile without having to resort to the removal of the ordinary bumper or to special brackets and fixtures for its connection to the car.

The present invention comprises upright plates or bars 4 which are provided at their rear with corrugated or notched faces 5 adapted to engage the locking lugs 6 on the plates or brackets 7 which clamp the usual bumper bars 1. Bolts or yokes 8 secure the bars 4 to certain ones of the brackets or plates 3, and 7. The locking lugs 6 and the notched part 5 enable each plate or bar 4 to be vertically adjusted to the desired height.

The outermost bars 4 are provided with guides 9 and in these guides are slidably mounted the carriers or supports 10 for the supplemental wheels 11. Coil springs 12 which encircle the carriers 10 are interposed between the upper guides 9 and the shoulders 13 of the carriers. Screw threaded plugs 14 loose on the upper ends of the carriers engage the upper guides 9 and the upper ends of springs 12 and enable any desired degree of compression to be put upon the springs 12, thus holding the wheels 11 down under any desired pressure and also providing a stout spring cushion for the wheels which will be adequate to support the automobile if either of the front wheels of the automobile is torn off or broken in an accident. By these means, accidental turning over of the car is prevented when an accident of the character specified occurs. Pins 10' carried by the supports 10, limit the downward movement of the supports by engaging the lower guides 9.

For the purpose of minimizing the impact or blow on a pedestrian or person struck by the bumper, I have provided a special pneumatic or inflatable rubber cushion 15 which has holes 16 for the reception of bolts 17 for its connection to the bars 4, holes 18 being provided in the bars to receive said bolts.

The cushion 15 is provided with freely projecting pneumatic bars or fingers 19 capable of independent as well as collective flexing when they strike a person or object. The fingers project freely into the open spaces 25 of the cushion 15. The entire cushion 15 presents the appearance and has the effect of a pneumatic grid whose bars or parts may independently yield or flex. A suitable valve nipple 20 is provided whereby air at low pressure may be admitted to the bumper cushion, including the fingers 19 thereof.

What I claim is:

1. The combination with an automobile bumper of the bar type, of a supplemental cushion bumper, and means for connecting the cushion bumper to the main bumper in an adjustable manner whereby it may be raised or lowered in relation thereto and secured where positioned.

2. The combination with an automobile bumper of the bar type, of a supplemental cushion bumper, and means for connecting the cushion bumper to the main bumper in an adjustable manner whereby it may be raised or lowered in relation thereto and secured where positioned, comprising a lug on one of said bumpers, a notched plate on the other of said bumpers, and fastening means for securing the bumpers together.

3. An automobile bumper provided with a pair of supplemental wheels adapted to serve as substitutes for the front wheels of the automobile but normally located above the surface over which the automobile travels.

4. An automobile bumper provided with vertically movable and vertically adjustable supplemental wheels adapted to serve as substitutes for the front wheels of the automobile but normally located above the surface over which the automobile travels.

5. An automobile bumper provided with vertically movable and vertically adjustable spring cushion supplemental wheels adapted to serve as substitutes for the front wheels of the automobile but normally located above the surface over which the automobile travels.

6. An automobile bumper provided with a pneumatic cushion having freely projecting bars.

7. An automobile bumper provided with a pneumatic cushion having freely projecting independently yieldable bars.

8. An automobile bumper having a pneumatic cushion of grid-like form.

9. An automobile bumper having a pneumatic cushion provided with a plurality of inflatable, independent, freely projecting, bars lying in substantially the same plane.

In testimony whereof I affix my signature.

HARRY RICHARD BEAVER.